(12) United States Patent
Lee

(10) Patent No.: US 7,831,900 B2
(45) Date of Patent: Nov. 9, 2010

(54) METHOD FOR PRESENTING MULTIMEDIA MESSAGES

(75) Inventor: Il-Do Lee, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 1270 days.

(21) Appl. No.: 11/259,239

(22) Filed: Oct. 25, 2005

(65) Prior Publication Data

US 2006/0156218 A1 Jul. 13, 2006

(30) Foreign Application Priority Data

Oct. 26, 2004 (KR) ...................... 10-2004-0085945
Oct. 27, 2004 (KR) ...................... 10-2004-0086374

(51) Int. Cl.
*G06F 17/00* (2006.01)
(52) U.S. Cl. ...................... 715/201; 715/203; 715/234; 715/236; 715/239; 715/240
(58) Field of Classification Search ................ 715/200, 715/201, 203, 234, 236, 239, 240
See application file for complete search history.

(56) References Cited

U.S. PATENT DOCUMENTS

| 2003/0016747 | A1 | 1/2003 | Westerink et al. | |
| 2004/0044647 | A1* | 3/2004 | Salmenkaita | 707/1 |
| 2004/0111476 | A1* | 6/2004 | Trossen et al. | 709/206 |
| 2004/0181550 | A1* | 9/2004 | Warsta et al. | 707/104.1 |
| 2004/0243674 | A1* | 12/2004 | Lu | 709/204 |
| 2005/0064883 | A1* | 3/2005 | Heck et al. | 455/466 |
| 2005/0143136 | A1* | 6/2005 | Lev et al. | 455/566 |
| 2005/0165913 | A1* | 7/2005 | Coulombe et al. | 709/219 |
| 2005/0174261 | A1* | 8/2005 | Laumen et al. | 341/50 |
| 2006/0007899 | A1* | 1/2006 | White | 370/338 |
| 2006/0052118 | A1* | 3/2006 | Furon et al. | 455/466 |
| 2006/0184609 | A1* | 8/2006 | Deng | 709/203 |

FOREIGN PATENT DOCUMENTS

JP 2000285047 A 10/2000

OTHER PUBLICATIONS

Jane Hunter, Suzanne Little: "Building and Indexing a Distributed Multimedia Presentation Archive Using SMIL," Springer-Verlag Berlin Heidelberg 2001, pp. 415-428, XP002362626.

* cited by examiner

*Primary Examiner*—Stephen S Hong
*Assistant Examiner*—Gregory J Vaughn
(74) *Attorney, Agent, or Firm*—Lee, Hong, Degerman, Kang & Waimey

(57) ABSTRACT

A method for presenting a multimedia message is disclosed. A layout rule is proposed to present a multimedia message without an SMIL document so that the multimedia message (e.g., Multipart.mixed type multimedia message, etc.) or an enclosure file (e.g., an enclosure file of Multipart.related type message, etc.) can be displayed in a sliding form although it does not have the SMIL document.

25 Claims, 4 Drawing Sheets

METHOD FOR PRESENTING MULTIMEDIA MESSAGES

CROSS-REFERENCE TO RELATED APPLICATIONS

Pursuant to 35 U.S.C. §119(a), this application claims the benefit of earlier filing date and right of priority to Korean Patent Application Nos. 10-2004-0085945 filed on Oct. 26, 2004, and 10-2004-0086374, filed on Oct. 27, 2004, the contents of which are hereby incorporated by reference herein in their entirety.

BACKGROUND OF THE INVENTION

1. Field of the Invention

The present invention relates to a multimedia messaging service (referred to, hereinafter, as 'MMS') and, more particularly, to a method for presenting a multimedia message.

2. Description of the Related Art

When a communications system for the Internet or for mobile communications transmits a multimedia message, each item of multimedia data (audio, video, text, etc.) is separately transmitted, and in this case, each item cannot cooperate with one another without performing detailed programming (e.g., SMIL: Synchronized Multimedia Integration Language).

In case of a mobile communications system, when a transmitting side transmits a multimedia message, a SMIL document is also transmitted together with each item of multimedia data (audio, video, text, etc.) to a receiving side, and the receiving side performs a presentation by connecting the objects of each multimedia data according to what the SMIL document defines.

The SMIL (Synchronized Multimedia Integration Language) is a language defining a reproduction position and time of each media to allow XML (extensible Markup Language) based multimedia data (text, messages (bmp, jpg, png, gif, etc.), audio (wav, mp3, etc.), video (mpeg, etc.)), and the like to be temporally and spatially reproduced. The SMIL (pronounced as 'smile') has been developed by a group called the World Wide WEB Consortium (W3C).

A related art mobile communications system defines how to present a multimedia message according to the SMIL document, and corresponding international standards can be found in MMS Conformance Document.2 Candidate Version 19 Feb. 2004), chapter 5.2. Presenting contents in conformity with such international standards, the related art mobile terminal performs a different presentation to present even the same multimedia message depending on how the multimedia message has been encoded.

FIG. 1 illustrates a method for presenting a Multipart.related type received by a mobile communication terminal, excerpted from international standards (MMS Conformance Document.2 Candidate Version 19 Feb. 2004), chapter 5.2).

As shown in FIG. 1, a multimedia message encoded as the Multipart.related type message includes the SMIL document and at least one or more slides. Each slide includes a maximum of two regions. When one slide has two regions, one is used for text and the other is used for an image or video.

When the Multipart.related type message is received, a receiving side mobile communications terminal connects the items (audio, video, text, etc.) of each multimedia data according to the definition of the SMIL document and performs the presentation.

However, in case of an enclosure (attachment) file received together with the Multipart.related type message, since the enclosure file does not include the SMIL document, it is shown to users only in a form of an enclosure list, and not presented in the form of slides, even though the enclosure file is a type of presentable media that allows slide presentation.

In addition, when the Multipart.mixed type multimedia message is received, because it does not include the SMIL document, the related art mobile communications terminal displays the Multipart.mixed type message only in the form of an enclosure (attachment) file.

Therefore, because the related art mobile terminal performs presentation by connecting items (objects) of multimedia data according to rules defined by the SMIL document, the problem arises in that a message, which is a presentable media but does not have the SMIL document, is only displayed as an enclosure list.

BRIEF DESCRIPTION OF THE INVENTION

Therefore, an object of the present invention is to provide a method for presenting a multimedia message capable of displaying a multimedia message in a slide form (i.e., a so-called "slide-show"), even if a SMIL document does not exist.

To achieve at least the above object in whole or in parts, there is provided a method for presenting a multimedia message including: receiving a multimedia message and checking whether a SMIL document is included in the received multimedia message; making a layout of the received message according to a rule set in a controller if the received message does not have the SMIL document; and presenting contents of the message according to the formed layout.

Preferably, the received multimedia message is a Multipart.mixed type message.

To achieve at least these advantages in whole or in parts, there is further provided a method for presenting a multimedia message including: receiving a multimedia message and making a layout of the received message according to what an SMIL document of the received message defines; checking whether the received message has an enclosure file; if the received message has an enclosure file, making a layout of the enclosure file according to a rule set in a controller and inserting it into a layout of the received message; and presenting contents of the message and the enclosure file according to the two formed layouts.

Preferably, the received multimedia message is a Multipart.related type message.

To achieve at least these advantages in whole or in parts, there is further provided a method for presenting a multimedia message including: determining a message type of a received multimedia message; making a defined layout according to the type of the message; and presenting contents of the received message according to the formed layout.

Preferably, the controller makes a first layout according to the rule set internally, if the type of the received message does not include a Synchronized Multimedia Integration Language document.

Preferably, the controller makes a second layout according to what the Synchronized Multimedia Integration Language document of the received message defines, if the type of the received message includes a Synchronized Multimedia Integration Language document.

Preferably, the method for presenting a multimedia message further includes: checking whether the received message has an enclosure file when the layout is completely made; and if the received message has an enclosure file, making a third layout according to the rule in the controller and inserting the third layout into the formed layout.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF THE INVENTION

The preferred embodiment of the present invention will now be described with reference to the accompanying drawings.

A communications terminal (e.g., mobile communications terminal) in accordance with the present invention includes a controller (not shown) for receiving a multimedia message (e.g., Multipart.related type message) and making a layout of the received multimedia message according to what an SMIL document of the received message defines, checks whether the received message has an enclosure file, making a layout of the enclosure file according to its rules if the received message has the enclosure file, inserting the layout of the enclosure file into the layout of the received multimedia message, and presenting contents of the message and the enclosure file according to the two formed layout.

Preferably, if the received message does not include the SMIL document (e.g., a Multipart.mixed type), the controller makes a layout of the received message according to the rules set in the controller and presents the contents of the message according to the formed layout.

Figure 1:
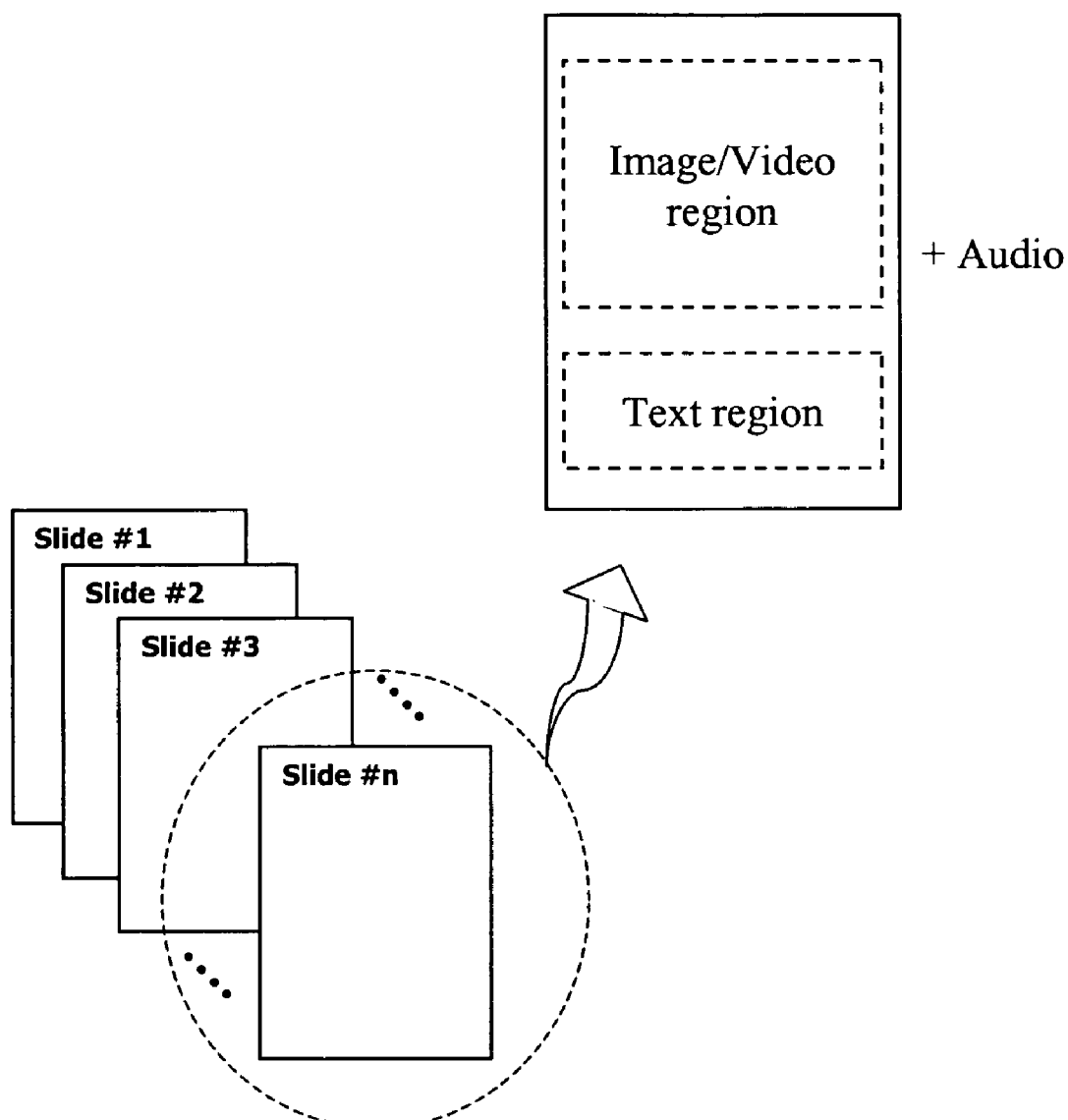
FIG. 1 illustrates a method for presenting a Multipart.related type message in accordance with a related art.
Figure 2:
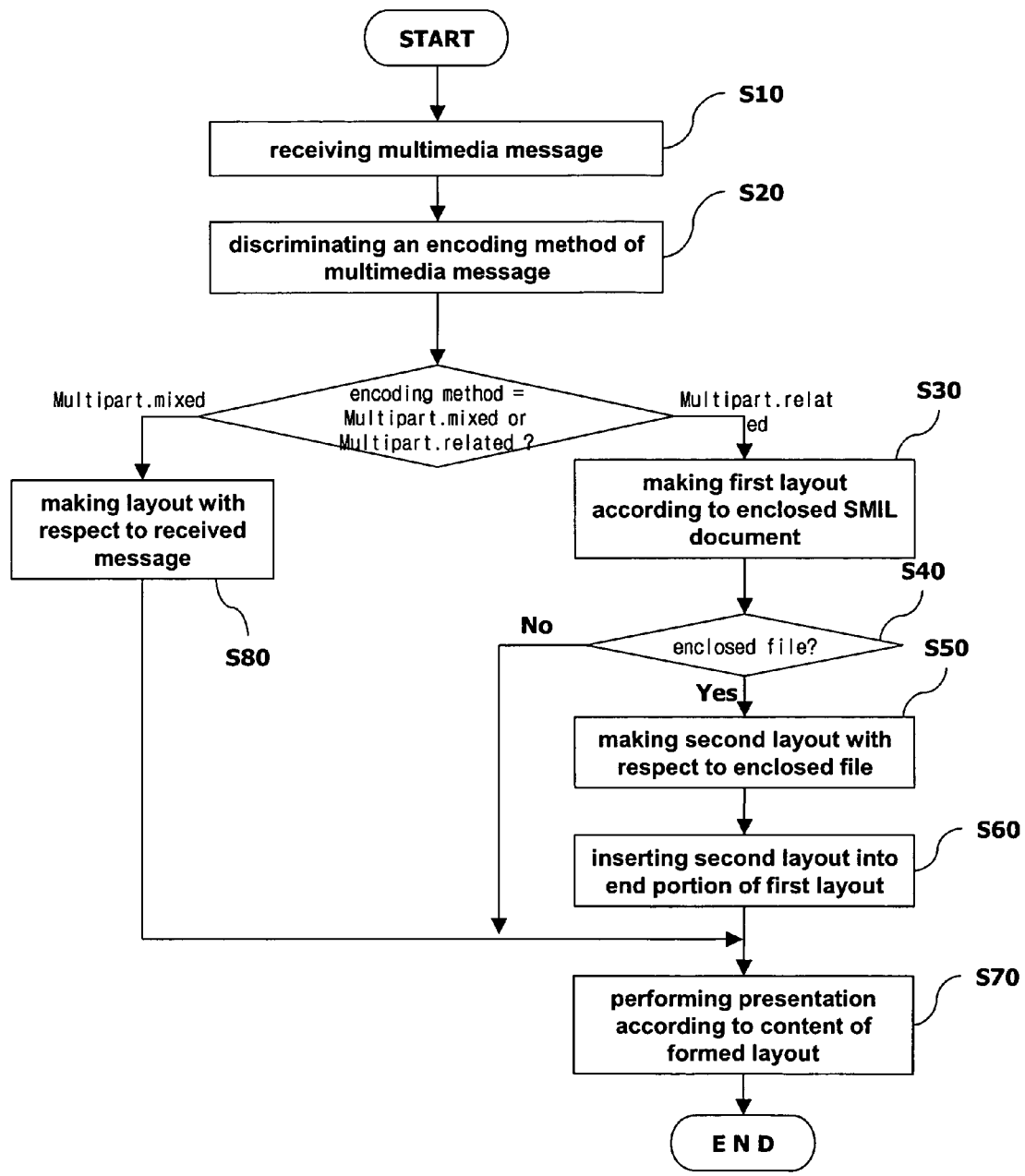
FIG. 2 is a flow chart illustrating processes of an exemplary method for presenting a multimedia message in accordance with the present invention.

FIG. 2 is a flow chart illustrating the processes of an exemplary method for presenting a multimedia message in accordance with the present invention.

As shown in FIG. 2, when a mobile communications terminal receives a multimedia message, a controller of the terminal discriminates a method according to which the received message has been encoded, namely, determines what type of multimedia message it is (steps S10 and S20). And then, the controller makes a layout according to a specific method depending on the discriminated message type (steps S30-S70).

If the received multimedia message includes a SMIL document like a Multipart.related type message, the controller makes a layout (referred to, hereinafter, as a 'first layout') with respect to contents (media objects such as images, video, text, audio, and the like) of the received message according to what the SMIL documents defines (step S30). After completing the first layout, the controller checks whether the received multimedia message has an enclosure (attachment) file (step S40).

If the received multimedia message does not have an enclosure (attachment) file, the controller performs a presentation to allow the contents of the received message to be displayed in a slide form ("slide show") according to the formed first layout (step S70). If, however, the received multimedia message has an enclosure file, the controller makes a layout (referred to, hereinafter, as a 'second layout') connecting respective media items (objects) of the enclosure file by applying a default layout to the enclosure file (step S50).

The default layout is applied in making the layout (second layout) of the multimedia message, which does not include the SMIL document or the enclosure file, and is made according to the following rules.

As stated above, for presentation, the controller generates at least one or more slides, each having a maximum two regions. If the generated slide has two regions, one is for text and the other is for images or video.

In order to make the layout of the message received without the SMIL document, first, the controller extracts image files from the multimedia message (or enclosure file), generates slides corresponding to the number of extracted image files, and inserts each image file to each corresponding slide. In this case, the slide includes two regions (image or video region and a text region). If video files exist in the multimedia message (or enclosure file), the controller additionally generates slides corresponding to the number of video files and inserts each video file to each corresponding slide.

Next, the controller extracts text files from the multimedia message (or enclosure file), and then, sequentially (or according to the rule set in the controller) inserts the text files into each text region of the generated slides (Slide #1, Slide #2, . . . , Slide #n). If a slide (Slide #1, Slide #2, . . . , Slide #n) includes a slide of the video file, the extracted text file is preferentially inserted into the slide of the image file and then inserted into the slide of the video file.

If there are more extracted text files than the image files (including video files), the controller additionally generates a slide having only the text region and inserts the extracted text file therein.

When insertion of the text file is completed, the controller checks whether an audio file exists in the multimedia message (or enclosure file). If an audio file (files) exists, the audio file (files) is extracted and sequentially (or according to the rule set in the controller) inserted into the generated slides (except for the slide including the video file).

Figure 4:
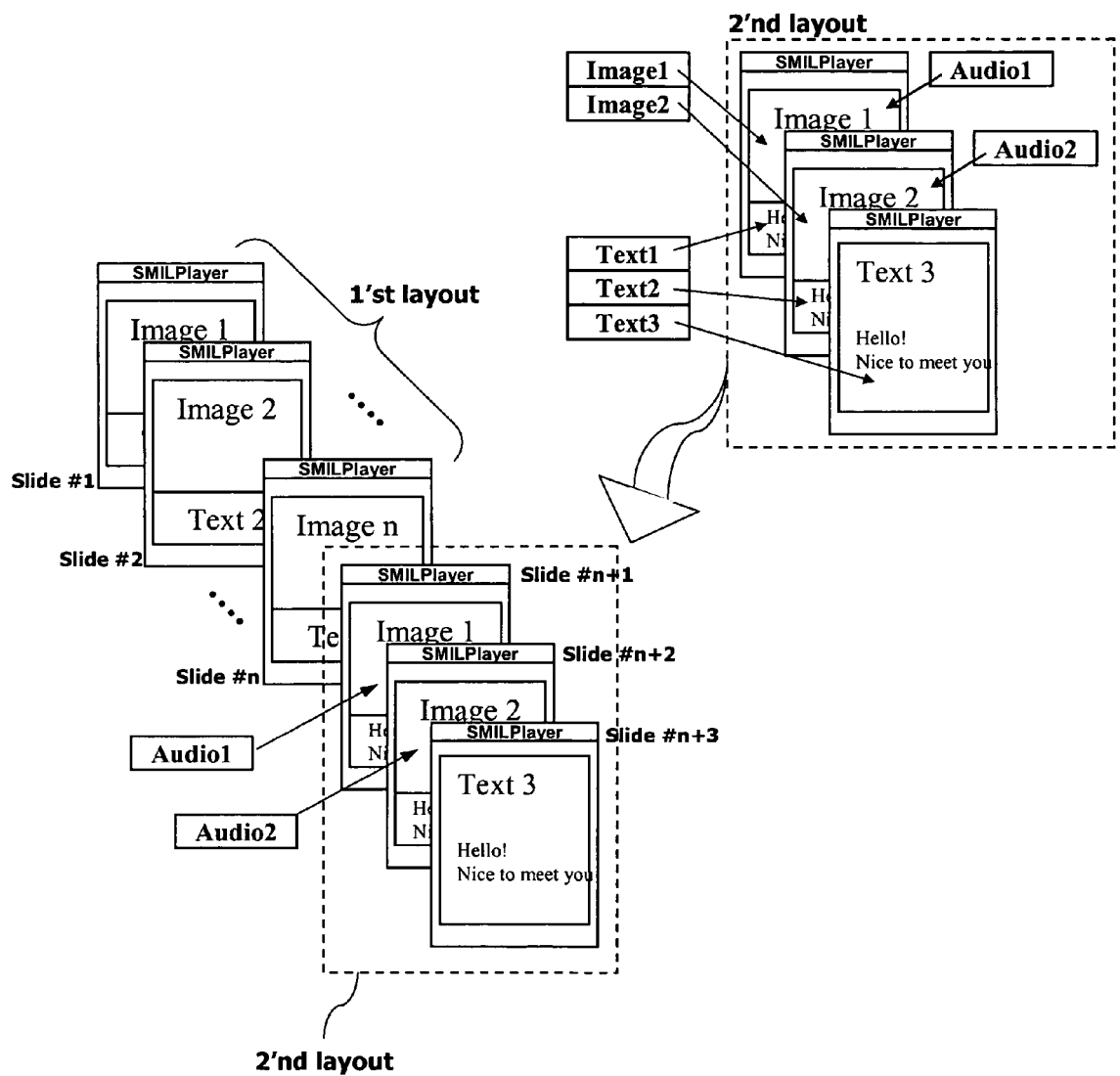
FIG. 4 illustrates an exemplary presentation of an enclosure file in accordance with the present invention.

When the second layout is made through the step S50, the controller inserts the second layout to an end portion of the first layout as shown in FIG. 4, and performs presentation on the multimedia message and the enclosure file according to the first and second layout.

Figure 3:
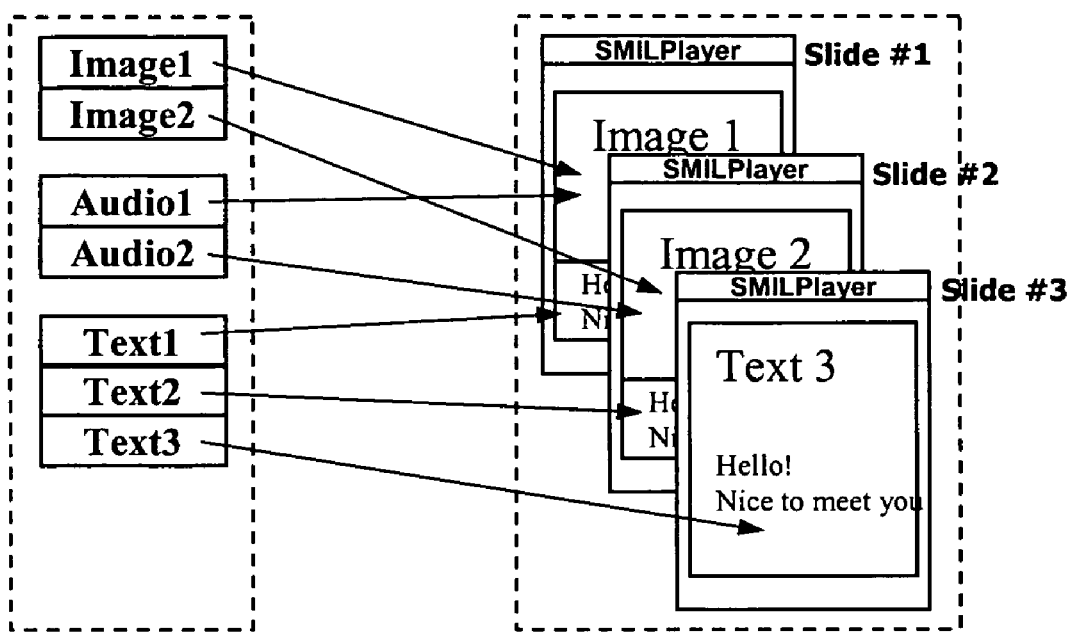
FIG. 3 illustrates an exemplary presentation of a Multipart.related type message in accordance with the present invention.

FIG. 3 illustrates an exemplary presentation of a Multipart.related type message in accordance with the present invention.

A case of receiving a multimedia message (e.g., Multipart.mixed type message) which does not have a SMIL document will now be described with reference to FIG. 3.

When a multimedia message is received by a mobile communications terminal, a controller of the mobile communications terminal discriminates a type of the multimedia message (steps S10 and S20). If the received multimedia message is the Multipart.mixed type, the controller makes a layout of the received message according to the default layout making rule (step S80).

For the sake of explanation, the layout making process (step S80) will now be described in detail with the assumption that the received multimedia message includes two image files, two audio files and three text files. However, it can be clearly understood that other combinations for a multimedia message are possible.

First, the controller generates slides corresponding to the number of image files included in the multimedia message, namely, two slides, and inserts the image files to each slide.

Next, the controller extracts the three text files from the multimedia message and sequentially (or according to the rule set in the controller) inserts two text files into a text region of the two slides. And then, the controller additionally generates one slide made up of only a text region and inserts the remaining one text file therein.

Thereafter, the controller extracts the audio files from the multimedia message and sequentially (or according to the rule set in the controller) inserts it into the three slides. In this case, only two audio files are inserted into each slide, so no audio file is inserted into the third slide (the additionally generated slide).

When the layout is completely made through the step S80, the controller performs a presentation of the received multimedia message according to the formed layout.

As so far described, the method for presenting a multimedia message in accordance with the present invention has the following advantages.

That is, a layout rule is proposed for presentation of a multimedia message without an SMIL document so that the multimedia message (e.g., Multipart.mixed type multimedia message, etc.) or an enclosure or attachment file (e.g., an enclosure file of Multipart.related type message, etc.) can be displayed in a slide format (slide show) although it does not have the SMIL document.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method for presenting a multimedia message comprising:
    receiving a multimedia message including a Synchronized Multimedia Integration Language (SMIL) document;
    forming a first layout, to be used for presenting multimedia data included in the multimedia message, according to the SMIL document;
    checking whether the received multimedia message has an enclosure file included in the multimedia message as an attachment in addition to the multimedia data included in the multimedia message, wherein the multimedia data is presentable according to the SMIL document and the attached enclosure file is not presentable according to the SMIL document;
    if the received message has the enclosure file, forming a second layout according to a rule set in a controller of a device receiving the multimedia message;
    inserting the second layout into the first layout; and
    presenting the multimedia data and content of the enclosure file according to the first and second layouts, respectively.

2. The method of claim 1, wherein the received multimedia message is a Multipart.mixed type message.

3. The method of claim 1, wherein the rule set in the controller comprises:
    generating slides corresponding to the number of images included in the received message and inserting each image to each slide;
    inserting text data included in the received message into the generated slides; and
    inserting audio data included in the received message into the generated slides.

4. The method of claim 3, wherein if the received message includes video data, the controller additionally generates slides corresponding to the number of video data and inserts each video data to each slide.

5. The method of claim 4, wherein the controller preferentially inserts the text data into a slide of an image.

6. The method of claim 3, wherein if there are more text data than the slides, a slide having only a text region is additionally generated, into which the text data is inserted.

7. The method of claim 3, wherein the slide includes an image/video region and a text region.

8. The method of claim 3, wherein the controller does not insert the audio data into the slide of the video.

9. A method for presenting a multimedia message comprising:
    receiving a multimedia message including multimedia data and an enclosure file attached to the multimedia message;
    making a first layout for presenting the multimedia data according to a Synchronized Multimedia Integration Language (SMIL) document associated with the received message;
    forming a second layout for presenting the enclosure file according to a rule set in a controller of the device receiving the multimedia message;
    inserting the second layout into the first layout; and
    presenting contents of the multimedia data and the enclosure file according to the first and second layouts respectively.

10. The method of claim 9, wherein the received multimedia message is a Multipart.related type message.

11. The method of claim 9, wherein the rule set in the controller comprises:
    generating slides corresponding to the number of images included in the enclosure file and inserting each image to each slide;
    inserting text data included in the enclosure file into the generated slides; and
    inserting audio data included in the enclosure file into the generated slides.

12. The method of claim 11, wherein if the enclosure file includes video data, the controller additionally generates slides corresponding to the number of video data and inserts each video data to each slide.

13. The method of claim 12, wherein the controller preferentially inserts the text data into a slide of an image.

14. The method of claim 11, wherein if there are more text data than the slides, a slide having only a text region is additionally generated, into which the text data is inserted.

15. The method of claim 11, wherein the slide includes an image/video region and a text region.

16. The method of claim 11, wherein the controller does not insert the audio data into the slide of the video.

17. A method for presenting content included in a multimedia message, the method comprising:

determining a message type of a received multimedia message including multimedia data and an enclosure file attached to the multimedia message;

making a first layout for presenting the multimedia message according to a SMIL document;

making a second layout for presenting content in the enclosure file according to a rule set in a controller of a device receiving the multimedia message;

inserting the second layout into the first layout; and presenting contents of the received message according to the first and second layouts.

18. The method of claim 17, wherein if the type of the received message does not include a Synchronized Multimedia Integration Language document, a controller makes a first layout according to the rule set internally.

19. The method of claim 18, wherein if the type of the received message includes a Synchronized Multimedia Integration Language document, the controller makes a second layout according to what the Synchronized Multimedia Integration Language document of the received message defines.

20. The method of claim 18, wherein the rule set in the controller comprises:

generating slides corresponding to the number of images included in the received message or in the enclosure file and inserting each image to each slide;

inserting text data included in the received message or in the enclosure file into the generated slides; and inserting audio data included in the received message or in the enclosure file into the generated slides.

21. The method of claim 20, wherein if the received message or the enclosure file includes video data, the controller additionally generates slides corresponding to the number of video data and inserts each video data to each slide.

22. The method of claim 21, wherein the controller preferentially inserts the text data into a slide of an image.

23. The method of claim 20, wherein if there are more text data than the slides, a slide having only a text region is additionally generated, into which the text data is inserted.

24. The method of claim 20, wherein the slide includes an image/video region and a text region.

25. The method of claim 20, wherein the controller does not insert the audio data into the slide of the video.

\* \* \* \* \*